(12) United States Patent
Petrica et al.

(10) Patent No.: US 8,819,834 B2
(45) Date of Patent: Aug. 26, 2014

(54) METHODS, SYSTEMS, AND COMPUTER READABLE MEDIA FOR AUTOMATICALLY GENERATING A FUZZER THAT IMPLEMENTS FUNCTIONAL AND FUZZ TESTING AND TESTING A NETWORK DEVICE USING THE FUZZER

(75) Inventors: Lucian Petrica, Popesti-Leordeni (RO); Octavian Mihai Radu, Ploiesti (RO)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 13/527,565

(22) Filed: Jun. 19, 2012

(65) Prior Publication Data

US 2013/0340083 A1    Dec. 19, 2013

(51) Int. Cl.
*G06F 11/00*  (2006.01)
*G06F 12/14*  (2006.01)
*G06F 12/16*  (2006.01)
*G08B 23/00*  (2006.01)

(52) U.S. Cl.
USPC .......................................................... 726/25

(58) Field of Classification Search
CPC ..................................................... G06F 21/577
USPC ......................................................... 726/25
See application file for complete search history.

(56) References Cited

U.S. PATENT DOCUMENTS

| 6,988,208 B2 * | 1/2006 | Hrabik et al. ................... 726/23 |
| 7,818,788 B2 * | 10/2010 | Meier ................................ 726/4 |
| 7,926,114 B2 * | 4/2011 | Neystadt et al. ................ 726/25 |
| 8,407,798 B1 * | 3/2013 | Lotem et al. .................... 726/25 |
| 2008/0288822 A1 | 11/2008 | Wu et al. |
| 2009/0328190 A1 | 12/2009 | Liu et al. |
| 2011/0078798 A1 | 3/2011 | Chen et al. |
| 2011/0302455 A1 | 12/2011 | Thomas et al. |

OTHER PUBLICATIONS

"A Model—based Approach to the Security Testing of Network Protocol Implementation," by William H. Allen, Chin Dou and Gerald A. Marin. Department of Computer Sciences. Florida Institute of Technology, Melbourne, FL. Copyright 2006 IEEE.*
Gorbunov et al., "AutoFuzz: Automated Network Protocol Fuzzing Framework", International Journal of Computer Science and Network Security, vol. 10, No. 8, pp. 239-245 (Aug. 2010).
Abdelnur et al., "KIF: A stateful SIP Fuzzer", Proceedings of the 1st international conference on Principles, systems and applications of IP telecommunications, pp. 47-56 (2007).
Banks et al., "SNOOZE: Toward a Stateful NetwOrk prOtocol fuzZEr", Information Security, pp. 343-358 (2006).
Screenshot of antiparser, antiparser.sourceforge.net (Aug. 17, 2005).
Aitel, "An Introduction to SPIKE, the Fuzzer Creation Kit", Immunity Inc., White Paper, pp. 1-32 (2004).

(Continued)

*Primary Examiner* — Dant Shaifer Harriman
(74) *Attorney, Agent, or Firm* — Jenkins, Wilson, Taylor & Hunt, P.A.

(57) ABSTRACT

Methods, systems, and computer readable media for automatically generating a fuzzer for testing a network device using the fuzzer are disclosed. According to one method, a functional description of a network communications protocol finite state machine is received as input. Operation of the protocol is simulated using the functional description of the network communications protocol finite state machine to generate a set of valid conversations in the protocol. A fuzzer is generated from the set of valid conversations. The fuzzer is used to send messages to test a device under test. Responses to the device under test to the messages generated by the fuzzer are analyzed.

18 Claims, 5 Drawing Sheets

(56) References Cited

OTHER PUBLICATIONS

Screenshot of Autodafé, an Act of Software Torture, autodafe.sourceforge.net (Copyright 2004-2006).

Wieser et al., "Security testing of SIP implementations", Technical Report, Columbia University, Department of Computer Science, pp. 1-7 (2003).

Notification of Transmittal of the International Search Report and the Written Opinion of the International Searching Authority, or the Declaration for International Application No. PCT/US2013/046129 (Nov. 8, 2013).

Commonly-assigned, co-pending U.S. Appl. No. 14/270,333 for "Methods, Systems, and Computer Readable Media for Providing Fuzz Testing Functionality," (Unpublished, filed May 5, 2014).

\* cited by examiner

METHODS, SYSTEMS, AND COMPUTER READABLE MEDIA FOR AUTOMATICALLY GENERATING A FUZZER THAT IMPLEMENTS FUNCTIONAL AND FUZZ TESTING AND TESTING A NETWORK DEVICE USING THE FUZZER

TECHNICAL FIELD

The subject matter described herein relates to testing of network devices. More particularly, the subject matter described herein relates to methods, systems, and computer readable media for automatically generating a fuzzer that implements functional and fuzz testing and testing a network device using the fuzzer.

BACKGROUND

Fuzzing is a term that refers to testing of a network device or software using a test that intentionally violates a network communications protocol. A computer program that implements fuzzing is referred to as a fuzzer. It is desirable that a fuzzer implement both stateless and stateful testing of a device under test. It is also desirable that the testing implemented by a fuzzer be comprehensive in terms of functional and fuzz testing, where functional testing refers to testing the responses of a device to test sequences or messages that are valid according to the protocol being tested and fuzz testing refers to testing the responses of the device to test sequences or messages that are invalid according to the protocol being tested. Manually programming such a fuzzer can be time consuming. Existing fuzzers fail to provide a framework for automatic test sequence generation in combination with analysis of test results.

Accordingly, there exists a need for methods, systems, and computer readable media for automatically generating a fuzzer that implements both functional and fuzz testing and for testing a network communications device using the fuzzer.

SUMMARY

Methods, systems, and computer readable media for automatically generating a fuzzer that implements functional and fuzz testing and for testing a network device using the fuzzer are disclosed. According to one method, a functional description of a network communications protocol finite state machine is received as input. Operation of the protocol is simulated using the functional description to generate a set of valid conversations in the protocol. A fuzzer is generated from the set of valid conversations. The fuzzer is used to send messages to test a device under test. Responses to the device under test to the messages generated by the fuzzer are analyzed.

A system for automatically generating a fuzzer and for testing a network device using the fuzzer is disclosed. The system includes a simulator for receiving as input a functional description of a network communications protocol finite state machine and for simulating, using the functional description, operation of the protocol to generate a set of valid conversations in the protocol. A fuzzer generator generates a fuzzer from the set of valid conversations. An analyzer uses the fuzzer to send messages to test a device under test and analyze responses of the device under test to the messages generated by the fuzzer.

The subject matter described herein can be implemented using a non-transitory computer readable medium having stored thereon executable instructions that when executed by the processor of a computer, control the computer to perform steps. In one example, the subject matter described herein may be implemented in software executed by a processor. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
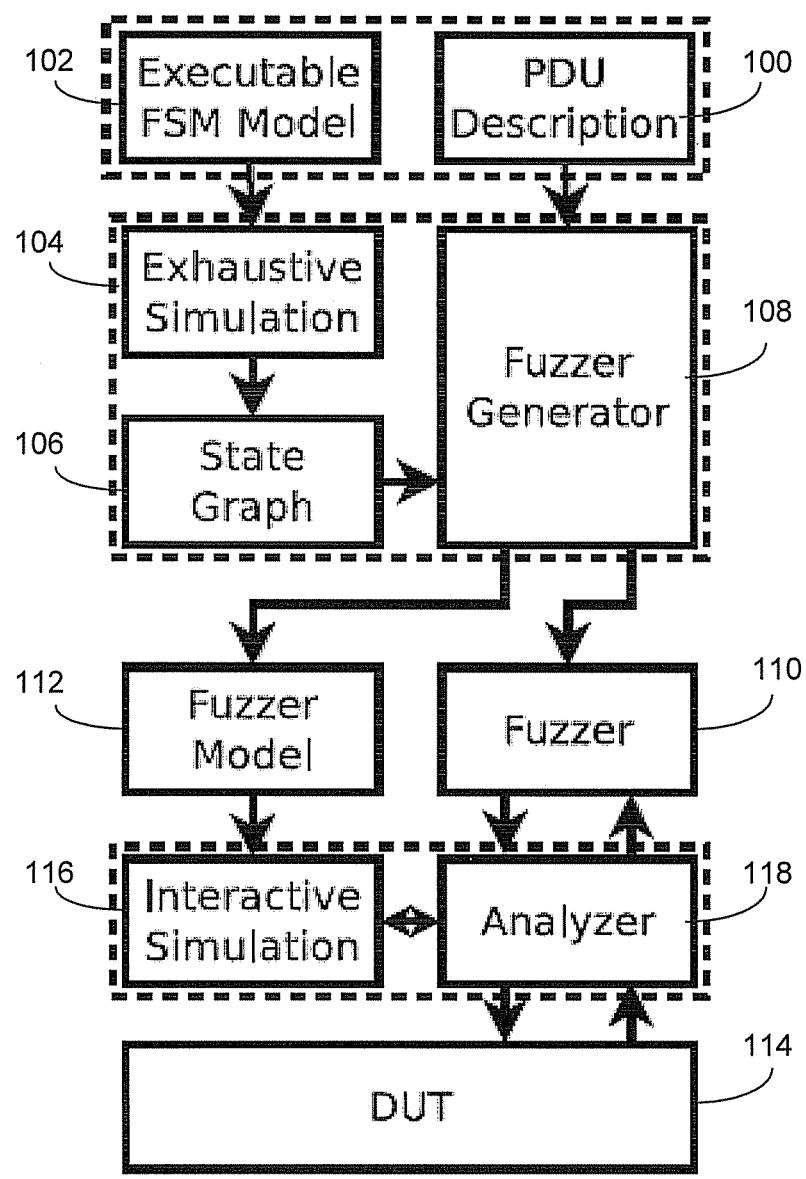
FIG. 1 is a block diagram of a system for automatically generating a fuzzer and for testing a network communications device using a fuzzer according to an embodiment of the subject matter described herein.

Security and robustness are critical properties which determine success or failure of a given software application. It is a known fact that the majority of the time-to-market and resources are spent testing the software before deployment. The importance of testing is reflected in modern agile, test-driven development methodologies, but these are sometimes impractical to implement because of the increased overhead of continually writing tests for each feature added. In this context, it is essential to develop a testing methodology which is effective and does not add much complexity or time to the development cycle. Any such methodology must feature a seamless integration of functional and security testing.

A proven method for security testing is fuzzing. When testing a software component, fuzzers will generate pseudo-random traffic across trust boundaries in the hope of finding unexpected sequences of data which trigger a fault. The effectiveness of this type of negative testing has been well documented, but the approach has been criticized for its shallow scope, since fuzzers are rarely able to test beyond the peripheral layers of the target application. This has led to the development of increasingly sophisticated fuzzers, which are able to conform to interface syntax and even learn communication patterns in an attempt to improve penetration rates. Despite any criticism, fuzzing remains a useful tool for security and robustness testing and an increasing number of software developers use fuzzing at one stage or another.

On the other end of the test spectrum is functional verification and model checking. SPIN is one the most popular model checkers, along with its associated functional language, Promela. A system designer can specify a protocol in Promela and then check the protocol for unwanted properties such as deadlocks and non-progress cycles. The Promela description also serves as an executable golden model of the system which the designers can use when checking the functionality of the final implementation.

The subject matter described herein includes an integrated test methodology which combines fuzzing with functional testing. The subject matter described herein provides a framework for automatic generation of fuzzing scripts from a functional description and a syntax specification of a system under test. Tests implemented by the fuzzers described herein explore functional scenarios, fuzzing at each step along the way and ensuring compliance with the functional description as well as system robustness and security. The subject matter described herein contributes to the state of the art in at least two ways. First, this is the first stateful protocol fuzzer which uses Promela and SPIN for state machine exploration of the target protocol. Secondly, a novel approach for test result analysis based on the simulation of the DUT model against a functional model of the actual fuzzer is described.

Fuzzing is an active research field and numerous fuzzers have been proposed with varying strengths and weaknesses and tailored to fuzzing specific types of software systems. Open-source fuzzing frameworks generally target network protocols and sometimes file interfaces. Among these are GPF, Peach, Antiparser, Autodafe [10, 9, 8, 7] and other fuzzers which present the user with a custom fuzzer development language used to describe the tested protocols. SPIKE [1] is one of the most popular open-source network fuzzers because of its block-based approach to constructing protocol data units. This approach allows the developer to split the PDU into blocks which are then handled by SPIKE's own fuzzing heuristics. This description method along with a helper API in C make for a powerful fuzzer, but SPIKE has been criticized for being too low-level, and also lacks features for describing stateful protocols.

Sulley [2] is a network protocol fuzzer developed in the spirit of SPIKE. Sulley exposes a Python API for describing protocol data units in a block-based fashion and handles transformations of these blocks automatically. While still lacking explicit support for fuzzing stateful protocols, Sulley does offer a framework to link several requests together in a session and allows callback functions and user-specified data encoders to modify the fuzzing process. Sulley also suffers from its static session construction algorithm, which does not allow the developer to pick which request to send based on previous replies from the DUT.

Several fuzzers have focused specifically on stateful network protocols. The most established of these has been developed as part of PROTOS [3], a security testing project at the University of Oulu. PROTOS uses a complex system of Java and TCL descriptions to model a protocol and extract a test scenario. Fuzzing transformations are applied to trigger specific vulnerabilities such as buffer overflows, and DUT aliveness is tested by following up the fuzzed request with a valid request for which the normal reply is known. The extent to which stateful fuzzers can be tested with the PROTOS fuzzer is unclear, since the framework was not released to the public. The released test-cases are simplistic and the description method appears to be overly complex.

Another stateful fuzzer is SNOOZE [4], which also makes use of a method for functional description of a protocol in XML. The custom language used by SNOOZE models the PDU as well as the protocol state machine. SNOOZE also exposes a Python API which allows the developer to query the protocol description in order to extract valid messages and replies. The developer uses this API to manually construct a test scenario consisting of send and receive events, and to guide the fuzzing of primitives within sent PDUs. SNOOZE is notable for its unified description language which allows complete specification of a protocol. Its main drawback is the requirement that a test scenario be written by hand, leaving protocol functional coverage up to the imagination and skill of the scenario developer. SNOOZE also uses a single type of attack to test the state machine.

A different approach to stateful protocol fuzzing is KiF [5], which does not use a protocol description but instead relies on captured traffic, which is then modified and replayed to the DUT. While this approach has been used by other fuzzers, AutoFuzz [6] being the most notable, KiF adds fuzzing primitives specifically suitable for state machine testing, such as message reordering, repeating and other attacks. AutoFuzz and KiF alike rely on capturing a complete state machine diagram from protocol messages sent and received by the DUT in normal conversations. This approach is very unlikely to uncover corner cases and cannot test a protocol implementation for completeness. KiF is also restricted to fuzzing the SIP protocol.

Objectives of the fuzzers described herein include integrating fuzzing and functional testing, automating stateful fuzzer generation and providing a method for automatic test analysis. Like PROTOS and SNOOZE, one implementation of the subject matter described herein starts from a protocol description, which the subject matter described herein uses to extract test scenarios, the protocol state machine, to generate fuzzing scripts and to analyze test results.

FIG. 1 is a block diagram of a system for automatically generating a fuzzer and for testing a network communications device using a fuzzer according to an embodiment of the subject matter described herein. Referring to FIG. 1, block 100 is a protocol data unit description that describes the fields and order of fields in protocol messages of the protocol being tested by the fuzzer. Examples of PDU descriptions will be illustrated below. Another input received by the system in FIG. 1 is a function description of a finite state machine model, which is represented by block 102, labeled executable FSM model in FIG. 1. The following example illustrates an example of a functional description of a SIP protocol that may be used to simulate the SIP protocol. This format may be input directly to simulator 104 or may be compiled into executable format before being input to simulator 104.

```
/* SIP messages */
mtype = {INVITE, ACK, BYE, CANCEL, OPTIONS, INFO}
/* SIP channels */
chan    REQUEST    =    [1]    of    {mtype,int,mtype,int};    /*    SName
{method,cseqv,cseqm,callid} */
chan RESPONSE = [1] of {int,int,mtype,int};
proctype UAC( ) {
        mtype method = INVITE;
        int cseqv = 20;
        mtype cseqm = INVITE;
        int callid = 1;
        int recv_method;
```

```
        int recv_cseqv;
        mtype recv_cseqm;
        int recv_callid;
        start:
            do
                :: method = INVITE; cseqm = INVITE;
REQUEST!method,cseqv,method,callid; goto wait_invite
                :: method = OPTIONS; cseqm = OPTIONS;
REQUEST!method,cseqv,cseqm,callid; goto wait_options
                :: method = INFO; cseqm = INFO;
REQUEST!method,cseqv,cseqm,callid; goto wait_info
            od;
        wait_invite:
            do
                ::
RESPONSE?recv_method,recv_cseqv,recv_cseqm,recv_callid;
                    if
                        :: (recv_callid == callid && recv_cseqv ==
cseqv && recv_cseqm == cseqm) ->
                            if
                                :: (recv_method == 100) -> goto
wait_invite
                                :: (recv_method == 200) -> goto
ack_invite
                                :: else -> assert(false)
                            fi;
                        :: (recv_method == OPTIONS) ->
REQUEST!200,recv_cseqv,recv_cseqm,recv_callid
                        :: else -> assert(false)
                    fi;
                :: REQUEST!CANCEL,cseqv,cseqm,callid; goto end
            od;
        ack_invite:
            REQUEST!ACK,recv_cseqv,ACK,recv_callid;
            goto connected;
        wait_options:
            do
                ::
RESPONSE?recv_method,recv_cseqv,recv_cseqm,recv_callid;
                    if
                        :: (recv_callid == callid && recv_cseqv ==
cseqv && recv_cseqm == cseqm) ->
                            if
                                :: (recv_method == 200) -> goto end
                                :: else -> assert(false)
                            fi;
                        :: else -> assert(false)
                    fi;
                :: REQUEST!CANCEL,cseqv,cseqm,callid; goto end
            od;
        wait_info:
            do
                ::
RESPONSE?recv_method,recv_cseqv,recv_cseqm,recv_callid;
                    if
                        :: (recv_callid == callid && recv_cseqv ==
cseqv && recv_cseqm == cseqm) ->
                            if
                                :: (recv_method == 200) -> goto end
                                :: else -> assert(false)
                            fi;
                        :: else -> assert(false)
                    fi;
                :: REQUEST!CANCEL,cseqv,cseqm,callid; goto end
            od;
        connected:
            cseqv = cseqv+1;
            REQUEST!BYE,cseqv,BYE,callid;
            goto end;
        end:
            RESPONSE?recv_method,recv_cseqv,recv_cseqm,recv_callid
}
proctype UAS( ) {
        int callid;
        int expected_ack_cseqv;
        mtype recv_method;
        int recv_cseqv;
        mtype recv_cseqm;
        int recv_callid;
```

-continued

```
    waiting:
        REQUEST?recv_method,recv_cseqv,recv_cseqm,recv_callid;
        if
            :: (recv_method == INVITE) -> goto ringing
            :: (recv_method == OPTIONS) -> goto send_options
            :: (recv_method == INFO) -> goto send_info
        fi;
    send_options:
    do
        :: RESPONSE!200,recv_cseqv,recv_cseqm,recv_callid; goto end
        :: REQUEST?CANCEL,recv_cseqv,recv_cseqm,recv_callid; goto
cancelling
    od;
    send_info:
    do
        :: RESPONSE!200,recv_cseqv,recv_cseqm,recv_callid; goto end
        :: REQUEST?CANCEL,recv_cseqv,recv_cseqm,recv_callid; goto
cancelling
    od;
    ringing:
    do
        :: REQUEST?CANCEL,recv_cseqv,recv_cseqm,recv_callid; goto
cancelling
        :: RESPONSE!100,recv_cseqv,recv_cseqm,recv_callid; goto
ringing
        :: RESPONSE!200,recv_cseqv,recv_cseqm,recv_callid;
            callid=recv_callid; expected_ack_cseqv=recv_cseqv; goto
answered
        :: RESPONSE!300,recv_cseqv,recv_cseqm,recv_callid; goto
end/*goto not_answered*/
        :: RESPONSE!400,recv_cseqv,recv_cseqm,recv_callid; goto
end/*goto not_answered*/
        :: RESPONSE!500,recv_cseqv,recv_cseqm,recv_callid; goto
end/*goto not_answered*/
        :: RESPONSE!600,recv_cseqv,recv_cseqm,recv_callid; goto
end/*goto not_answered*/
    od;
    cancelling:
        RESPONSE!400,recv_cseqv,recv_cseqm,recv_callid;
        goto end;
    answered:
        REQUEST?recv_method,recv_cseqv,recv_cseqm,recv_callid;
        if
            :: (recv_method == CANCEL && expected_ack_cseqv ==
recv_cseqv) -> goto cancelling
            :: (recv_callid == callid && recv_method == ACK &&
expected_ack_cseqv == recv_cseqv && recv_cseqm == ACK) -> goto end
            :: else -> assert(false)
        fi;
    end:
    do
        :: REQUEST?CANCEL,recv_cseqv,recv_cseqm,recv_callid;
goto cancelling
    od;
}
init { atomic { run UAC( );
        run UAS( )
        } }
```

EXAMPLE 1

Functional Description of SIP Protocol

A simulator 104 exhaustively simulates executable FSM model 102 to generate a state graph 106. The state graph represents a complete set of possible valid conversations in the protocol. An example of such a state graph will be provided below. State graph 106 and PDU description 100 are input to a fuzzer generator 108. Fuzzer generator 108 generates a fuzzer 110 and a fuzzer model 112. Fuzzer 110 implements attacks that include attacks based on messages with valid but unexpected parameter values and attacks that include state transitions that are functionally illegal according to the communications protocol being tested. Fuzzer 110 applies the attacks to test a device under test 114. Device under test 114 may be any suitable network communications device, such as a switch, a router, a server, a firewall, a storage element, a front end to a storage element, etc. Fuzzer model 112 applies the same attack code being applied by fuzzer 110 to a simulator 116, which simulates operation of the device under test, to generate an expected response by the device under test to the fuzzer code. An analyzer 118 compares the expected response generated by simulator 116 to the response generated by device under test 114 and reports the results to a user.

Figure 2:
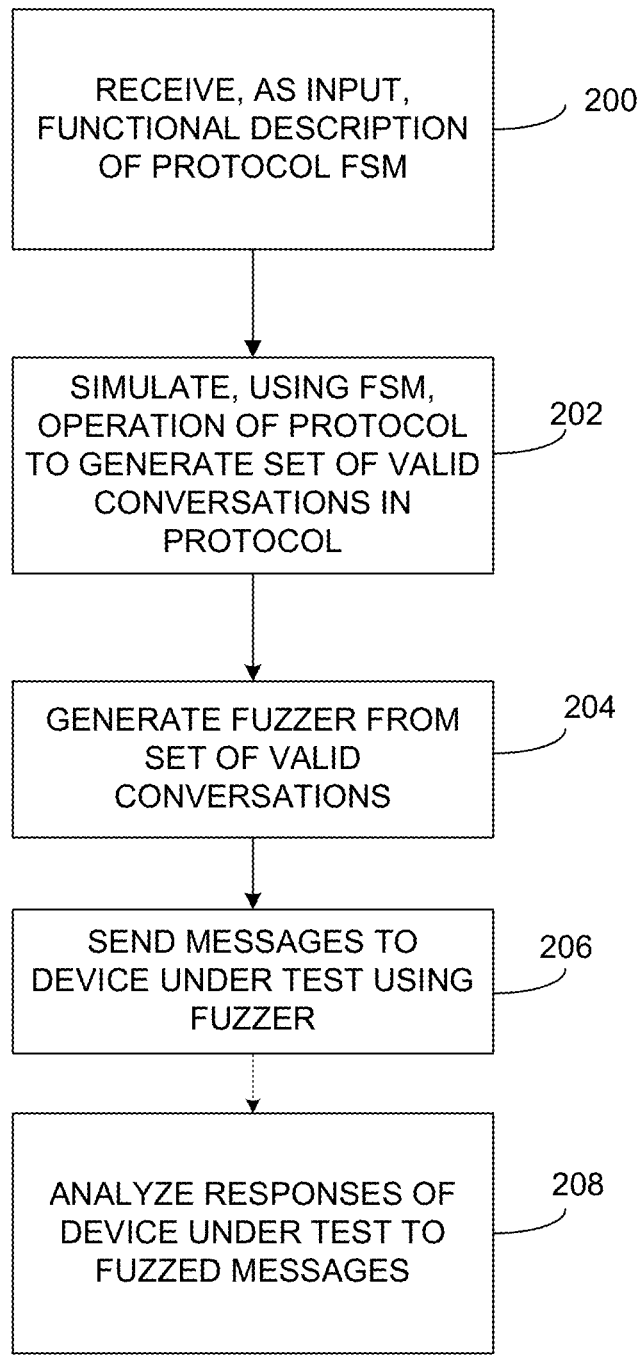
FIG. 2 is a flow chart illustrating an exemplary process for automatically generating a fuzzer and for testing a network communications device using a fuzzer according to an embodiment of the subject matter described herein.

FIG. 2 is flow chart illustrating exemplary overall steps for automatically generating a fuzzer and testing a network device using the fuzzer according to an embodiment of the subject matter described herein. Referring to FIG. 2, in step 200, a functional description of a network communications protocol finite state machine is received as input. For example, in FIG. 1, executable FSM model 102 may be received as input to simulator 104. In step 202, the operation of the protocol is simulated to generate a set of valid conversations in the protocol. In FIG. 1, simulator 104 exhaustively simulates the protocol to generate a complete set of valid state transitions indicated by state graph 106.

In step 204, a fuzzer is generated from the set of valid conversations. For example, fuzzer generator 108 may generate fuzzer 110. In step 206, the fuzzer is used to send messages to a device under test. For example, in FIG. 1, fuzzer 110 may send fuzzed messages to device under test 114. In step 208, responses of the device under test to the fuzzed messages are analyzed. For example, referring to FIG. 1, analyzer 118 analyzes responses of device under test 114 by comparing the responses to expected responses generated by simulator 116.

The following sections will describe examples of inputs and outputs of fuzzer generator 108 and the use of fuzzer 110 to test a device under test.

In the examples described herein, a combination of Promela and Sulley blocks to describe the protocol under test. Promela is used to model the protocol state machine, while the PDU is coded using the Sulley blocks API. If there are multiple types of PDU, each type will constitute a Sulley request, as specified in the API. Those fields in the PDU which are relevant to state machine functionality are marked in the Sulley blocks and in Promela meta-comments. These meta-comments are recognized and used by fuzzer generator 108. The Promela model consists of a complete protocol system, comprising all communicating protocol agents, whereby each agent is a separate Promela process. The PDU description also specifies test harness information such as DUT addresses, ports, and transport protocols. Fuzzer 110 currently uses Sulley's API for UDP and TCP sockets but transport over HTTP or other higher-level protocols can also be implemented. An example setup over UDP can be seen in Example 2. The PDU, FSM and harness descriptions are the only input provided to fuzzer generator 108 by the user, all other steps are fully automated.

The Promela description must adhere to a set of structural rules, as well as contain the above-mentioned meta-comments, in order to properly link up with the PDU description. Communication between processes must occur through channels, and each channel may transfer a single type of PDU. If, for example, there are two types of PDU, a request and a response, then a channel must be declared to carry requests and a separate channel to carry responses. Example 2 below shows such a set-up. Example 3 below shows selections of the corresponding Sulley blocks description for the protocol PDU.

```
/* SIP channels */
/* SName {method, cseqv, cseqm, callid} */
chan plp2 REQUEST = [1] of {mtype,int,mtype,int};
/* SName {code,cseqv,cseqm,callid}
Chan p2pl_RESPONSE = [1] of {int,int,mtype,int};
```

EXAMPLE 2

Promela Metacomments

```
s_initialize ("REQUEST")
...
s_string (method, fuzzable-True)
...
s_int (callid, format="ascii, fuzzable=True)
...
s_int (cseqv, format="ascii", fuzzable=False)
...
s_string (cseqm, fuzzable-False)
s_initialize ("RESPONSE")
...
s_int (code, format= "ascii", fuzzable=True)
...
s_int (callid, format="ascii", fuzzable=True)
...
s_int (cseqv, format="ascii", fuzzable=False)
...
s_string (cseqm, fuzzable=False)
```

EXAMPLE 3

Sulley PDU Description

Fuzzer generation focuses on each protocol agent in turn. Promela is a nondeterministic language so the simulation behaviour depends on the initial seed of the random number generator in SPIN. The FSM model is simulated exhaustively by repeatedly running SPIN with different initial seeds. Example 5 shows sample output of the SPIN simulation. Conversations between the selected protocol agent and the rest of the system are recorded and used to construct the protocol conversation state graph. Example 4 is a description of the protocol and IP address of the device under test. In this graph there are two types of states: send states which emit a protocol message and receive states which absorb a message. Fuzzer generator 108 uses the graph and PDU description to generate fuzzing scripts, which consist of Sulley sessions and blocks, as well as callback functions and encoders required to set FSM-related fields and do graph traversal. Fuzzer generator 108 outputs fuzzer 110 as a Python script as well as a fuzzer model 112 in Promela.

```
sess = sessions.session (proto="udp", bind=("192.168.1.135", 5060))
target = sessions.target ("192.168.1.118", 5060)
sess.add_target (target)
```

EXAMPLE 4

Sulley Target Description

| proc 1 (UAC) sip_sulley2.pml:24 | Send OPTIONS, 20, OPTIONS, 1 | -> queue 1 (plp2_REQUEST) |
| proc 2 (UAS) sip_sulley2.pml:97 | Recv OPTIONS, 20, OPTIONS, 1 | <- queue 1 (plp2_REQUEST) |
| proc 2 (UAS) sip_sulley2.pml:106 | Send 200, 20, OPTIONS, 1 | -> queue 1 (plp1_RESPONSE) |
| proc 1 (UAC) sip_sulley2.pml:59 | Send CANCEL, 20, OPTIONS, 1 | -> queue 1 (plp2_REQUEST) |
| proc 2 (UAS) sip_sulley2.pml:142 | Recv CANCEL, 20, OPTIONS, 1 | <- queue 1 (plp2_REQUEST) |

| | | |
|---|---|---|
| proc 1 (UAC) sip_sulley2.pml:82 | Recv 200, 20, OPTIONS, 1 | <- queue 1 (plp2_RESPONSE) |
| proc 2 (UAS) sip_sulley2.pml:129 | Send 400, 20, OPTIONS, 1 | -> queue 1 (plp2_RESPONSE) |

EXAMPLE 5

Sample SPIN Output

The generated Promela model 112 for fuzzer 110 consists of a process representing fuzzer 110 and a process representing the fuzzed agent (i.e., DUT 114), extracted directly out of the original protocol description. This model is then interactively simulated in SPIN to extract expected conversations. In this context, interactivity refers to the interaction of the SPIN simulation with analyzer 118, not with the user. At each step, the interactive simulation presents a set of possible actions by the fuzzer process or the DUT process. The analyzer is an adaptation layer between the fuzzer, the DUT and the simulation. It inspects fuzzer and DUT outputs in order to select from the presented options in SPIN and guide the interactive simulation. The simulation behaviour of the system is then compared with actual conversations between fuzzer 110 and the DUT 114. Analyzer 118 reports any mismatch to the user. Identified problems can either be caused by fuzzer 110 or can be functional mismatches between the protocol specification and the implementation. Analyzer 118 is an optional part of the fuzzing framework. It is however essential for detecting subtle faults which do not cause DUT 114 to crash or hang.

When fuzzing fields in a PDU, a fuzzing framework like Sulley uses type-dependent heuristics to generate relevant attacks. For example, Sulley attacks integer fields by loading into them the maximum value, zero or other corner-case values. String fields, on the other hand, are attacked by long strings, malformed ASCII, insertion of metacharacters and so on. Fuzzing the state machine, however, requires a different set of attacks which are most likely to trigger a fault in the protocol implementation. While traversing the state graph, fuzzer 110 can choose to apply any one of the available attacks in each state. The following is a set of state machine attacks, which fuzzer 110 may implement:

Skip Receive This attack skips the receive state without waiting for a reply from the DUT. The expected reply may be en-route, in which case the attack may trigger a race condition.

Skip Send This attack skips emitting a message in a sequence. Since this attack violates FSM ordering, all subsequent emitted messages should be seen as unexpected at the DUT and handled correctly.

Random Fields When this attack is selected for the currently emitted message, the PDU fields related to state machine functionality, as specified in the Promela model metacomments, will randomly take values within the allowable ranges specified in the model. That is, integer fields will randomly assume any value in their range and strings will assume one of the Promela mtype values. This attack will generate a malformed message which should be detected correctly by the DUT.

Replay Resend a sequence of one or more PDUs which were previously sent to the DUT. This attack will test how the implementation handles resent messages as well as possibly triggering a race condition.

Fast Forward This attack will suspend transmission of messages and will instead store them in a queue. Subsequent additions of messages to the queue will trigger all available messages to be transmitted in rapid succession. This will test if the DUT is able to handle fast sequences of messages correctly.

Fuzzer 110 may navigate the conversation state graph in order to mimic valid functionality and fuzz deep within the protocol, applying the above-mentioned state machine attacks. The attacks fall into two categories, which are emission attacks like Fast Forward and Random Fields, and traversal attacks. The traversal attacks can be implemented by adding supplementary edges to the original graph, representing functionally illegal (fuzz) transitions. The sole restriction is that such a transition must not end in a receive state. Emission attacks and fuzz transitions have associated counters which decrement each time the transition is taken or the attack is applied, thus ensuring the test completes in finite time. Legal transitions do not have an associated counter but must be taken at least once.

Figure 3A:
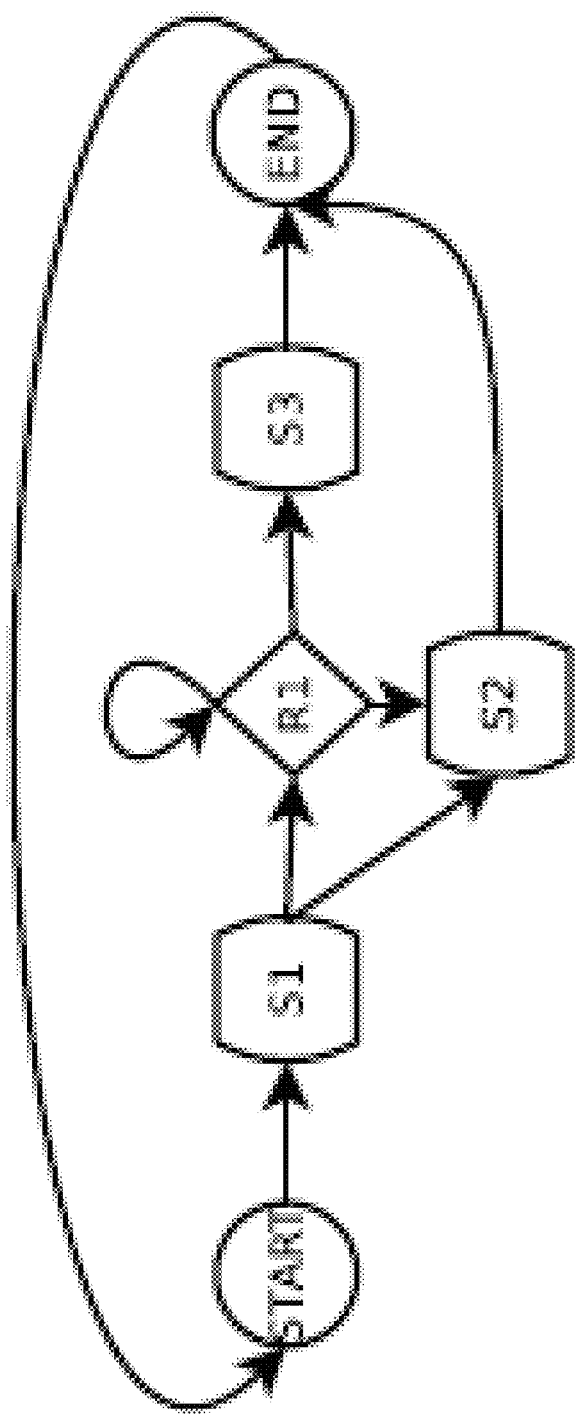
FIGS. 3A and 3B illustrate exemplary original and fuzzed state graphs according to an embodiment of the subject matter described herein.
Figure 3B:
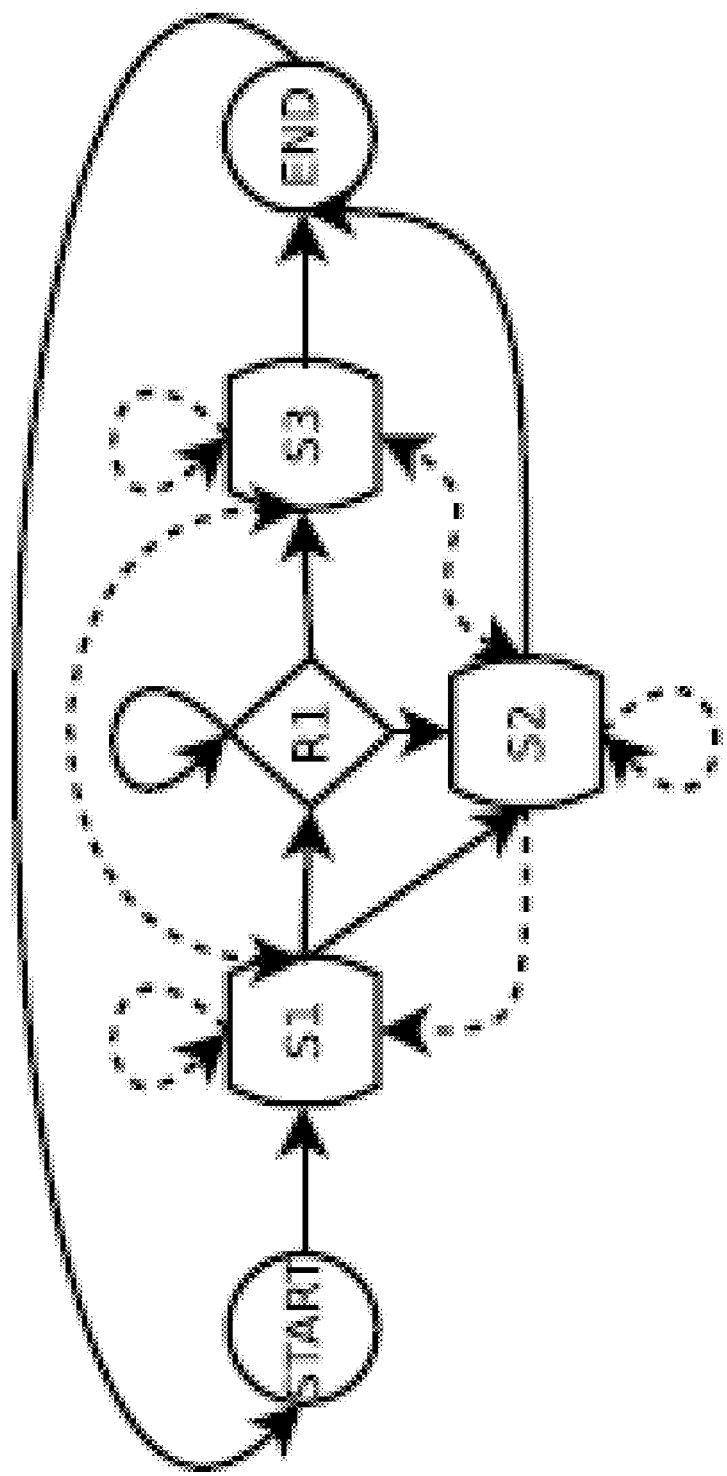

The traversal algorithm is the following. If it is in a send state, fuzzer 110 emits the required PDU, randomly choosing to apply a PDU attack or not. If an attack is applied, the corresponding counter is decremented. Emission attacks can no longer be selected after their associated counter reaches zero. After PDU emission, fuzzer 110 transitions to the next state. If transitions to multiple states are possible, one will be chosen randomly. In a receive state, fuzzer 110 waits until it receives a specified message and proceeds to the next state accordingly. Each time a fuzz transition is taken, its counter is decremented. If the counter reaches zero, the transition is deleted. When all attack counters in each state reach zero, and no more fuzz transitions are present, fuzzer 110 does one more pass over the conversation graph and declares the test complete. FIG. 3A presents an example conversation state graph and FIG. 3B presents its corresponding fuzzed version, with fuzz transitions represented in dotted lines.

The proposed fuzzing framework described herein was evaluated by testing an implementation of the Session Initiation Protocol. SIP was selected because it is widely-used in Voice-Over-IP services, and is a stateful protocol. Secondly, there has already been research on fuzzers for SIP, which have been discussed above. The PROTOS fuzzing suite will serve as a benchmark against which to measure the proposed fuzzer.

The SIP implementation under test is Linphone, a free and open-source soft phone. Linphone was chosen because of its popularity and multi-platform nature. We tested two Linux versions of Linphone, 3.3.2 and 3.5.2, which were at the time of testing the default version in Ubuntu Linux and the latest Linphone version, respectively. Both Linphone versions were installed in a virtual machine environment and started in auto-answer mode, to provide the stateful fuzzer with an opportunity to test DUT behaviour beyond the call request phase.

Figure 4:
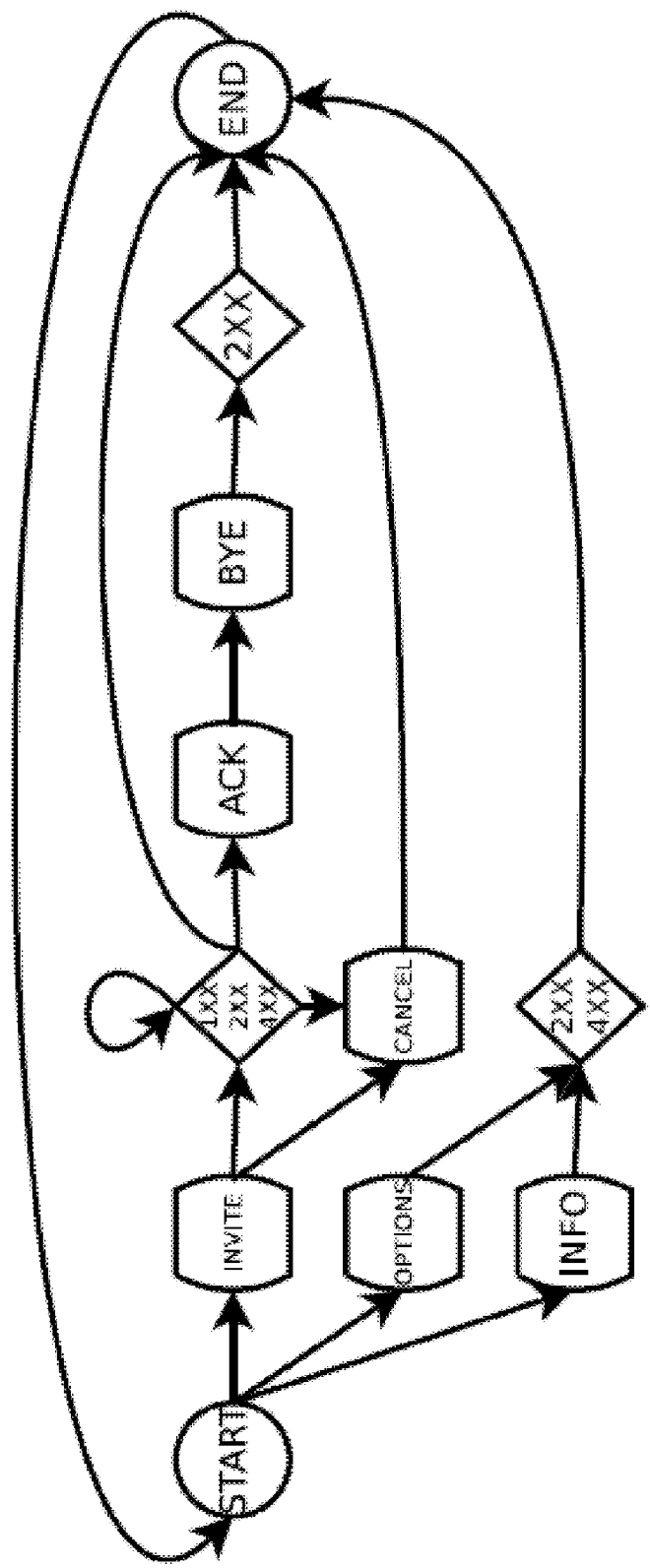
FIG. 4 is a state diagram illustrating a fuzzed SIP graph according to an embodiment of the subject matter described herein.

A protocol description for SIP was written from RFC 3261. The ABNF description of the protocol syntax was used to generate the Sulley blocks. Default values for PDU fields were manually inserted into the blocks. A Promela description of the SIP state machine was also written, taking into account only "MUST" and "MUST NOT" clauses in the RFC. This approach was chosen because we wanted the generated fuzzer to be constrained as little as possible, thereby increasing the likelihood of finding bugs in any particular implementation of the protocol. We implemented a minimal set of SIP functionality: the INVITE dialog, which includes ACK, BYE and CANCEL requests, and two session-independent requests, OPTIONS and INFO. Also, system structure was minimal, comprising only of one UAC and one UAS. The description comprises about 100 lines of code, excluding comments. Fuzzer generator 108 was used to generate Sulley scripts for testing the UAS. It found seven unique state-machine traversal scenarios, which together cover the full functionality of the modeled SIP system. The resulting conversation state graph is presented in FIG. 4. The fuzzer script was executed against Linphone, with a total of over ten thousand individual test cases that cover both parser and state machine attacks.

During testing we found numerous issues with the Linphone parser, as well as three state machine bugs. All of the parser bugs consisted of segmentation faults caused by inproper syntax in the SIP PDU. Most commonly, crashes were caused by lacking CRLFs between headers and also malformed header names. Header names were also found to be vulnerable to buffer overflow attacks. The SIP version number in the request line was also vulnerable to attack. All bugs were found on both Linphone versions under test and have been submitted to the developers. Some of the parser bugs were also found by testing Linphone against the PROTOS fuzzer.

State machine attacks against the SIP state machine in Linphone were much less successful, but we nevertheless found several issues, including one which caused Linphone to crash. The first was a potential information leak vulnerability triggered by invalid URIs in the SIP invite request, which caused Linphone to send data to a random port on the UAC. This data was non-null and it did not consist of a valid SIP reply, and therefore we must conclude an unwanted information leak occurred. Another issue was a denial-of-service condition in Linphone 3.3.2, caused by repeated invites and cancelling of invites. After a number of such conversation sequences, Linphone stops sending provisional responses to invites, which leaves the UAC unable to determine the liveness status of Linphone. The third issue is a crash caused by the transmission of a malformed request from the UAC while Linphone is hanging up an existing call. These issues were not detected by the PROTOS fuzzing suite and have also been reported to the developers.

As we can see, not all the bugs we found caused crashes. Arguably the most potential for a hacker exploit lies with the data leak vulnerability, which did not cause a crash and did not interfere with the otherwise normal functionality of Linphone. Being able to monitor traffic between the UAS and UAC and compare it to traffic generated by the executable model in SPIN allowed us to detect such subtle functional faults. In this respect we have improved on previous work such as the PROTOS fuzzer, which was only able to trigger parser faults.

REFERENCES

The references listed below, as well as all references cited in the specification, are incorporated herein by reference to the extent that they supplement, explain, provide a background for, or teach methodology, techniques, and/or compositions employed herein.

[1] Dave Aitel, "An Introduction to SPIKE, the Fuzzer Creation Kit", Immunity Inc. White Paper, 2004
[2] Pedram Amini, Aaron Portnoy, "Sulley Fuzzing Framework", (www.fuzzing.org/wp-content/SulleyManual.pdf)
[3] Christian Wieser, Marko Laakso, Hennig Schulzrinne, "Security testing of SIP implementations", Technical Report, Columbia University, Department of Computer Science, 2003
[4] Greg Banks, Marco Cova, Viktoria Felmetsger, Kevin Almeroth, Richard Kemmerer, Giovanni Vigna, "SNOOZE: Toward a Stateful NetwOrk prOtocol fuzZEr", Information Security, p 343-358, 2006
[5] Humberto Abdelnur, Radu State, Olivier Festor, "KiF: A Stateful SIP Fuzzer", Proceedings of the 1st international conference on Principles, systems and applications of IP telecommunications, p 47-56, 2007
[6] Serge Gorbunov, Arnold Rosenbloom, "AutoFuzz: Automated Network Protocol Fuzzing", International Journal of Computer Science and Network Security, Volume 10, 2010
[7] www.vdalabs.com/tools/efs_gpf.html
[8] antiparser.sourceforge.net
[9] autodafe.sourceforge.net
[10] peachfuzzer.com It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for automatically generating a fuzzer and testing a network device using the fuzzer, the method comprising:
receiving as input, a functional description of a network communications protocol finite state machine and a protocol data unit (PDU) description, the functional description of the network communications protocol including meta-comments that identify fields of the PDU description relevant to functionality of the state machine;
simulating, using the functional description of the network communications protocol finite state machine and the PDU description, operation of the protocol to generate a set of valid conversations in the protocol;
generating, based on the simulation, a fuzzer and a fuzzer model, wherein the fuzzer model includes a process representing the fuzzer and a process representing a device under test (DUT), wherein generating the fuzzer includes automatically linking the functional description with the fields of the PDU description relevant to functionality of the state machine using the meta-comments;
simulating the fuzzer model to extract expected conversations between the fuzzer and the DUT;
using the fuzzer to send messages to test the DUT; and
analyzing responses of the DUT to the messages generated by the fuzzer by comparing responses generated by the fuzzer to messages from the expected conversations generated by the simulation of the fuzzer model.

2. The method of claim 1 wherein generating a fuzzer includes traversing a state graph corresponding to the set of valid conversations, and, in each state, determining whether or not to implement an attack.

3. The method of claim 2 comprising, in response to determining to implement an attack, implementing an emission attack where the fuzzer generates protocol messages with fields that have valid but unexpected values.

4. The method of claim 3 wherein the emission attack comprises a random fields attack.

5. The method of claim 2 wherein the attack comprises a fast forward attack where transmission of messages is suspended, messages are queued, and transmission is restarted using the queued messages.

6. The method of claim 2 comprising, in response to determining to implement an attack, implementing a traversal attack where the fuzzer makes functionally illegal state transitions according to the network communications protocol.

7. The method of claim 6 comprising maintaining attack counters for each state to track illegal transitions made from each state and to control test duration based on the counters.

8. The method of claim 6 wherein the traversal attack comprises a skip send attack, a skip receive attack or a replay resend attack.

9. A system for automatically generating a fuzzer and testing a network device using the fuzzer, the system comprising:
- a first simulator for receiving as input a functional description of a network communications protocol finite state machine, the functional description of the network communications protocol including meta-comments that identify fields of a PDU description relevant to functionality of the state machine, and simulating, using the functional description of the network communications protocol finite state machine, operation of the protocol to generate a set of valid conversations in the protocol;
- a fuzzer generator for receiving as input a PDU description and output of the first simulator and for generating, based on the output and the PDU description, a fuzzer and a fuzzer model, wherein the fuzzer model includes a process representing the fuzzer and a process representing a device under test (DUT), wherein generating the fuzzer includes automatically linking the functional description with the PDU fields relevant to functionality of the state machine using the meta-comments; and
- a second simulator for simulating the fuzzer model to extract expected conversations between the fuzzer and the DUT;
- an analyzer for using the fuzzer to send messages to test a device under test and analyzing responses of the device under test to the messages generated by the fuzzer by comparing responses generated by the fuzzer to messages from the expected conversations generated by the simulation of the fuzzer model.

10. The system of claim 9 wherein the fuzzer is configured to traverse a state graph corresponding to the set of valid conversations and, in each state, to determine whether or not to implement an attack.

11. The system of claim 9 wherein, in response to determining to implement an attack, the fuzzer is configured to implement emission attack by fuzzing at least one field in a protocol message such that the field has a valid but unexpected value.

12. The system of claim 11 wherein the emission attack comprises a random fields attack.

13. The system of claim 11 wherein the attack comprises a fast forward attack where transmission of messages is suspended, messages are queued, and transmission is restarted using the queued messages.

14. The system of claim 9 wherein, in response to determining to implement an attack, the fuzzer is configured to implement a traversal attack where the fuzzer makes functionally illegal state transitions according to the network communications protocol.

15. The system of claim 14 wherein the fuzzer is configured to maintain counters for tracking illegal transitions made from each state and to control test duration based on the counters.

16. The system of claim 14 wherein the traversal attack comprises a skip send attack, a skip receive attack or a replay resend attack.

17. The system of claim 9 wherein the fuzzer is configured to implement functional and fuzz testing of the device under test.

18. A non-transitory computer readable medium having stored thereon executable instructions that when executed by the processor of a computer control the computer to perform steps comprising:
- receiving as input, a functional description of a network communications protocol finite state machine and a protocol data unit (PDU) description, the functional description of the network communications protocol including meta-comments that identify fields of the PDU description relevant to functionality of the state machine;
- simulating, using the functional description of the network communications protocol finite state machine and the PDU description, operation of the protocol to generate a set of valid conversations in the protocol;
- generating, based on the simulation, a fuzzer and a fuzzer model, wherein the fuzzer model includes a process representing the fuzzer and a process representing a device under test (DUT), wherein generating the fuzzer includes automatically linking the functional description with the fields of the PDU description relevant to functionality of the state machine using the meta-comments;
- simulating the fuzzer model to extract expected conversations between the fuzzer and the DUT;
- using the fuzzer to send messages to test the DUT; and
- analyzing responses of the DUT to the messages generated by the fuzzer by comparing responses generated by the fuzzer to messages from the expected conversations generated by the simulation of the fuzzer model.

* * * * *